Patented May 29, 1934

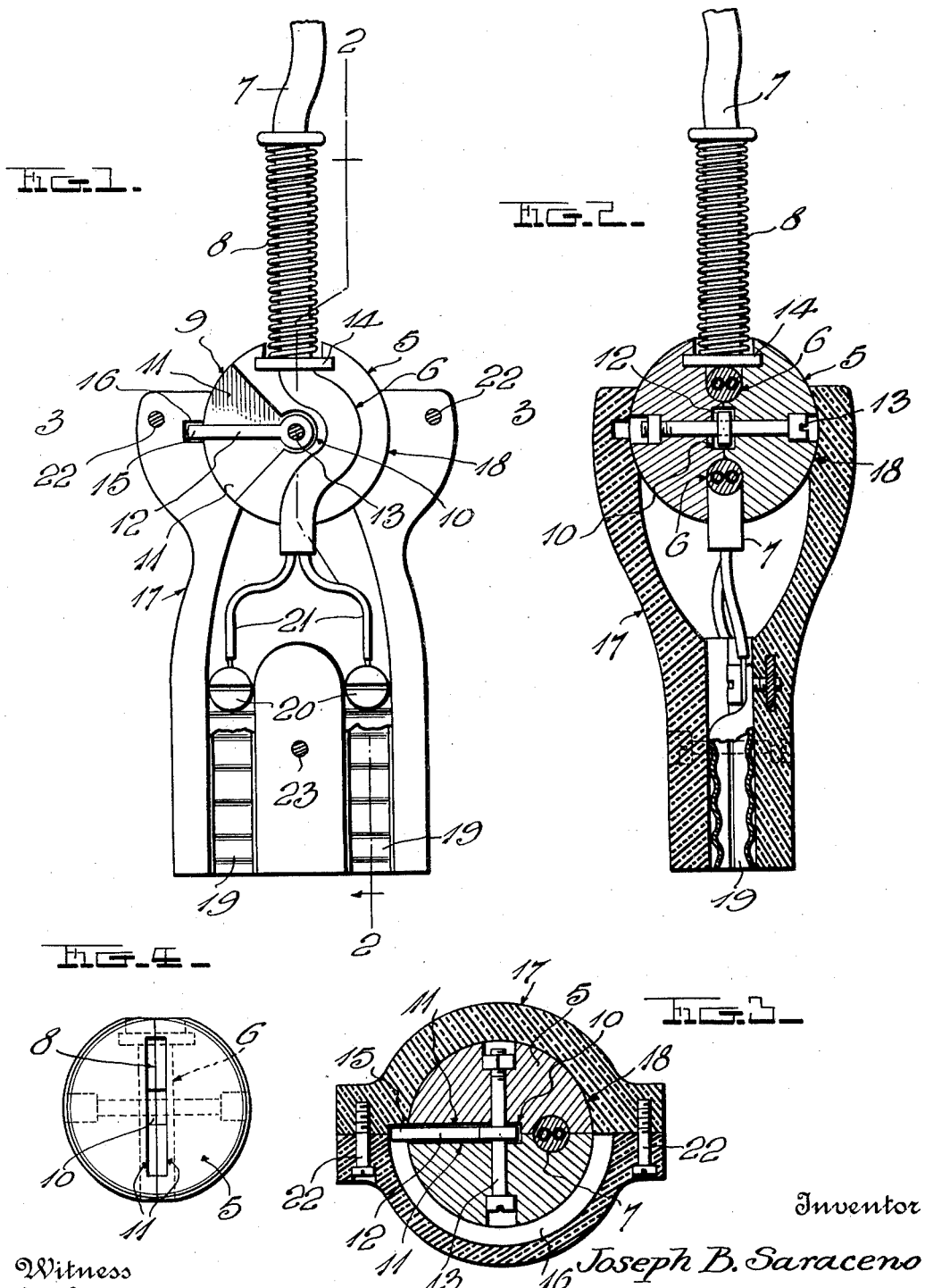

1,961,013

UNITED STATES PATENT OFFICE 1,961,013

ELECTRICAL APPLIANCE PLUG

Joseph Battista Saraceno, Bloomfield, Conn.

Application June 27, 1932, Serial No. 619,538

3 Claims. (Cl. 173—332)

The invention relates to ball joints for the usual fabric or rubber-covered conducting cables used for electric irons, percolators, vacuum cleaners and various other electrical appliances, and while I have shown said joint as part of an appliance plug, it is not restricted to use in this connection.

The object of the invention is to provide a rather simple and inexpensive, yet an efficient and long-lived universal or ball joint in which novel provision is made to limit movements of the ball within the socket, so that no such extreme movements shall take place as to twist or tend to break the cable.

With the foregoing in view, the invention resides in the novel subject matter hereinafter described and claimed, description being accomplished by reference to the accompanying drawing Fig. 1 is a longitudinal sectional view through an appliance plug embodying the invention.

Fig. 2 is another longitudinal sectional view substantially on line 2—2 of Fig. 1.

Fig. 3 is a transverse sectional view on line 3—3 of Fig. 1.

Fig. 4 is a side elevation of the ball.

In the drawing above briefly described, the numeral 5 denotes a ball having a tortuous passage 6 formed therethrough to receive the conventional fabric or rubber-covered, dual-wire conductor cord or cable 7, the usual spring protector 8 being preferably provided, said protector being secured in a conventional or any preferred manner to said ball.

The ball 5 is formed with a recess 9 which is preferably of the segmental shape shown, the inner end 10 of said recess however being preferably concentric with one of the various axes of the ball. The recess 9 opens through the periphery of the ball 5 and is elongated circumferentially of the latter, said recess preferably having parallel side walls 11. An arm 12, preferably of metal, is disposed in the recess 9 and extends radially of the ball 5, the inner end of said arm being pivoted to the ball within the inner end 10 of said recess on an axis at right angles to the length of the latter. The arm pivot may well be formed by a bolt 13, and in the present showing, this bolt clamps two halves 5, of which the ball is formed, tightly together. I prefer to form the ball in two halves to facilitate positioning of the cable 7 in the passage 6, anchoring of the conventional inner end 14 of the protector 8 to the ball, and mounting of the arm 12. Drawing of said sections together clamps the cable 7 and hence takes pull strain from the two wires and the contacts with which they are connected.

The outer end 15 of the arm 12 projects beyond the ball and is received in an arcuate groove 16 formed within a body 17, this body being provided with a socket 18 receiving the ball 5. The groove 16 extends partially around the circumference of the socket wall and extends across the recess 9, said groove being preferably of about 65 180° in length and said recess preferably of substantially 90° in length.

By providing the ball and socket, the recess 9, the pivoted arm 12, and the groove 16 receiving the projecting end of this arm, movements of the ball in various directions, will be so limited that there is no danger of twisting or otherwise injuring the conductor 7. Movement of the ball to the right or left from the position shown in Fig. 1 or any similar position, will be limited by striking of the ends of the recess 9 against the arm 12, and turning of said ball about an axis extending longitudinally of the body 17, will be limited by striking of the projecting arm end 15 against the ends of the groove 16.

In the construction herein disclosed, the body 17 is shaped similarly to the bodies of conventional appliance plugs, and said body contains appropriate contacts 19 for engagement with appliance contacts. These contacts 19 are provided with binding screws 20 for connecting the current-conducting wires 21 therewith, and it will be obvious that any desired means may be employed to hold the contacts 19 against longitudinal sliding within the body 17. Also, these contacts may be of any desired construction.

To facilitate mounting of the ball 5 in the socket 18, mounting of the contacts 19, and connection of the wires 21 with said contacts, the body 17 is preferably formed from two halves secured together by appropriate fasteners 22 and 23.

Excellent results are obtainable from the details disclosed and they are therefore preferably followed. However, within the scope of the invention as claimed, variations may of course be made.

I claim:—

1. A joint of the class described comprising a ball having a passage therethrough to receive an electrical conductor, said ball being provided with a recess opening through the periphery of and elongated circumferentially of said ball, an arm in said recess disposed radially of said ball and having its outer end projecting beyond said ball, a pivot connecting the inner end of said arm with said ball and disposed at right angles to the length of said recess, and a body having a socket receiving said ball, said body having an internal groove receiving the projecting end of said arm, said groove extending partially around the wall of said socket and extending across said recess, whereby movements of the ball will be limited by striking of the ends of said recess against said arm and by striking of said arm against the ends of said groove.

2. A structure as specified in claim 1; said ball being formed of two halves secured together by a bolt, said bolt forming said pivot of said arm.

3. In an electrical connection plug, a body having a spherical socket in its outer end and appliance-engaging contacts at its inner end, a ball mounted in said socket for turning movement in all directions, said ball having a tortuous passage therethrough and being divided, in a plane extending longitudinally through said passage, into two halves, a conductor cord passing through said tortuous passage and having conductors secured to said contacts, and means for clamping said two halves of said ball together to thereby clamp said conductor cord against withdrawal from said passage.

JOSEPH BATTISTA SARACENO.